United States Patent Office 3,081,148
Patented Mar. 12, 1963

3,081,148
INHIBITION OF POST PRECIPITATION OF URANIUM IN BARREN LIQUOR OF CARBONATE LEACHING PROCESS
John C. Hillyer and James L. Hart, Bartlesville, Okla., assignors to Phillips Petroleum Company, a corporation of Delaware
No Drawing. Filed Dec. 21, 1959, Ser. No. 860,724
3 Claims. (Cl. 23—14.5)

This invention relates to the recovery of uranium from uranium-bearing materials such as uranium ore. More particularly, it relates to the recovery of uranium values from uranium ore, such as coffinite, by the carbonate leaching process.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content, such as coffinite. It is this leaching process that is the concern of this subject invention.

The carbonate leaching process for extracting uranium values from uranium-bearing materials comprises contacting crushed uranium-bearing ore with hot recycle aqueous alkaline carbonate-bicarbonate solution and, where the uranium minerals contain uranium in the quadrivalent state, an oxidizing agent such as potassium permanganate or air, to form a slurry of leached pulp and pregnant leach liquor containing the stable, soluble uranyl tricarbonate complex anion. The pregnant leach solution is then separated from the tailings, for example by filtration, and after it is clarified the uranium values are precipitated from the pregnant leach solution, for example by the addition of sodium hydroxide. The resulting precipitate comprising sodium diuranate (called "yellow cake"), is then separated, for example by filtration, from the remaining carbonate leach solution, and dried. The carbonate solution recovered from this last separation is called "barren liquor" (although it does generally contain some unprecipitated soluble uranium values) and it is regenerated by passing carbon dioxide through it, using, for example, a supply of waste carbon dioxide such as flue gas, waste roaster gas, etc. The recarbonated barren liquor is then used as a wash liquid in the separation of tailings from the pregnant leach liquor, and then recycled to the process for reuse as leaching solution.

Several difficulties have been encountered in the use of the carbonate leaching process due to the incomplete precipitation of the uranium values. Although the precipitation is substantially quantitative, a small but significant amount of soluble uranium values is not precipitated and is carried along with the barren liquor from which it slowly precipitates out. This post precipitation results in a loss of a small but economically significant amount of valuable uranium values, especially when the barren liquor is used as a wash liquid in the filtration of the leached pulp. An appreciable amount of post-precipitated uranium values tends to collect on the pulp filters together with the tailings and is later removed with the tailings and passed to a tailings pond or other waste disposal means. The loss of these valuable uranium values, especially where very low grade uranium ores are leached, is material and represents a severe economic burden on the process.

Accordingly, an object of this invention is to improve the recovery of uranium from uranium-bearing materials such as uranium ore. Another object is to provide an improved method of recovering uranium values from uranium ore, such as coffinite, by the carbonate leaching process. Another object is to increase the recovery of valuable uranium values obtained by the carbonate leaching process. Another object is to inhibit, prevent, or minimize the post precipitation of a small but significant amount of soluble uranium values present in the barren liquor of the carbonate leaching process. A further object is to maintain in solution the soluble uranium values present in the barren liquor of the carbonate leaching process until after the barren liquor has been regenerated and returned to the uranium leaching cycle. Other objects and advantages of this invention will become apparent to those skilled in the art, without departing from the scope and spirit of this invention, from the following discussion and appended claims.

Briefly stated, the subject invention comprises treating the barren liquor of a carbonate leaching process with a small but sufficient amount of hydrogen peroxide to inhibit, prevent or minimize the post precipitation of soluble uranium values present in the barren liquor.

As mentioned above, the barren liquor is obtained by precipitating and separating uranium values from the clarified pregnant leach solution. In the normal operations of a carbonate leaching process, aqueous sodium hydroxide is used as the precipitant in precipitating the uranium values as a precipitate comprising sodium diuranate. In precipitating the uranium values, the caustic first neutralizes bicarbonate, raising the pH of the pregnant leach solution to about pH 11.5, and then an excess of caustic causes precipitation of the uranium values at a pH of about 12.3. An excess of caustic of about 4 to 5 grams per liter will usually be sufficient. Following precipitation, the resulting slurry is generally passed through a thickener and the thickened slurry passed to a filter to remove the precipitated "yellow cake." The overflow from the thickener will generally have a small amount of precipitate floating on the surface thereof and it can be removed by passing the overflow through a small filter, such as a Sparkler filter just upstream of the recarbonation tower. The barren liquor is regenerated in a standard packed tower with waste carbon dioxide, such as flue gas. The recarbonated barren liquor is then utilized as a wash liquid in the pulp filters, after which it is recycled to the leaching step.

As mentioned above, although the precipitation of the uranium values by the addition of caustic to the pregnant leach solution results in the precipitation of 97–99 percent of the uranium values, 100 percent precipitation is not achieved. A small but significant amount of soluble uranium values is not precipitated and these uranium values tend to precipiate out in the barren liquor. When the barren liquor has been recarbonated and is used as a wash liquid in the pulp filters, these post-precipitated uranium values are generally passed along with the tailings to disposal, thus resulting in the loss of these post-precipitated valuable uranium values. This loss is substantially prevented or minimized, according to the practice of this invention, by treatment of the barren carbonate leach liquor with a small but sufficient amount of hydrogen peroxide to substantially inhibit, prevent or minimize the post precipitation of these soluble uranium values.

The hydrogen peroxide employed in the process of this invention generally will be an aqueous hydrogen peroxide solution containing from about 10 to 60 weight percent hydrogen peroxide. The most preferred concentration of this solution is 30 percent by weight hydrogen peroxide, since this concentration is more readily available from commercial sources. The amount of hydrogen peroxide added to the barren liquor will be at least 0.3 gram of $H_2O_2$ per gram of soluble uranium values, measured as $U_3O_8$, present in the liquor. Generally, from 0.3 to 1 gram of $H_2O_2$ per gram of $U_3O_8$ will be sufficient. Larger amounts can be employed, if desired, but will not generally be necessary. Smaller amounts can also be used, but they generally will not result in the complete prevention of post precipitation of the uranium values. This hydrogen peroxide treatment of the barren liquor generally is carried out at a temperature of 50 to 200° F., preferably from about 100 to 180° F.

In normal operations of a carbonate leach plant, the slurry from the precipitation step, wherein caustic is added to precipitate the uranium values as a precipitate comprising sodium diuranate, is passed through a thickener, and the overflow from this thickener is the barren liquor which is returned for recarbonation. Since some solid yellow cake is floating on this overflow fluid, a small filter such as a Sparkler filter is employed to remove this small amount of product. This stream of barren liquor is then recarbonated, after which the recarbonated liquor is utilized as wash fluid in the pulp filters. The treatment of the barren liquor with hydrogen peroxide will be carried out just downstream of the filter which removes the floating yellow cake and just upstream of the recarbonation step, according to the invention.

While we do not intended to limit our invention to any theory of operation, it is believed that a chemical complex is formed between $U_3O_8$ and the $H_2O_2$, and 0.3 gram of $H_2O_2$ per gram of the $U_3O_8$ is the stoichiometric amount necessary to combine with soluble uranium values present in the barren liquor.

The following examples will further illustrate the objects and advantages of this invention, but it is to be understood that the various amounts, treating conditions, etc., set forth in these examples are merely illustrative of the preferred embodiments of this invention and should not be construed to unduly limit the same.

EXAMPLE I

A number of aqueous carbonate solutions containing soluble uranium values were treated with various amounts of hydrogen peroxide, according to this invention. In each of these runs the amount of soluble uranium values in the carbonate solutions was greater than that normally occurring in barren liquors in order to obtain measurable amounts in the laboratory quantities employed. In all but one of these runs, 500 ml. of the carbonate solution was treated with an amount of hydrogen peroxide, after which 25 percent weight to volume aqueous sodium hydroxide was added, the end point for this neutralization being 11.5. The neutralized solution was then heated to 60° C. and additional sodium hydroxide solution was added, to provide an excess of at least 8 grams per liter. These runs were carried out in stainless steel beakers, and agitation was used for 6 hours at 60° C., the volume of the sample being maintained by periodic addition of water to keep the level at the starting point. At the end of the 6 hour period, the resulting mixture was filtered through a fine Selas crucible, and the amount of soluble uranium values remaining in the barren filtrate was measured by X-ray analysis, the amount of yellow cake which had been precipitated being measured by difference. Two additional runs were made wherein the identical procedure was carried out except that no hydrogen peroxide was added. Results of this investigation are set forth in Table I.

*Table 1*

| Run no. | $U_3O_8$ present in carbonate sample, g./l. | Amount of $H_2O_2$ added | | Amount of precipitated $U_3O_8$, wt. percent | Amount of $U_3O_8$ left in barrens, g./l. |
| --- | --- | --- | --- | --- | --- |
| | | ml. of 30% $H_2O_2$ soln. | g. $H_2O_2$ per g. $U_3O_8$ | | |
| 1 | 2.09 | 1.0 | 0.390 | nil | |
| 2 | 2.11 | 0.4 | 0.111 | 61.40 | 0.7590 |
| 3 | 2.11 | 0.2 | 0.057 | 78.75 | 0.4100 |
| 4 | 2.11 | 0 | 0 | 96.72 | 0.0627 |
| 5[1] | 2.11 | 0 | 0 | 96.01 | 0.0770 |

[1] In this run, a volume of 6,000 ml. of carbonate sample was used.

The data in Table I show that the hydrogen peroxide treatment of carbonate leach solutions containing soluble uranium values is highly effective in inhibiting the precipitation of these values.

EXAMPLE II

In a uranium processing plant employing the carbonate leaching process, a pregnant carbonate leach liquor containing 2.5 g./l. $U_3O_8$ is treated with aqueous sodium hydroxide to precipitate most of the uranium values present as a precipitate comprising sodium diuranate. The resulting barren liquor contains, after removal of a small amount of floating yellow cake by means of a filter, 0.09 g./l. $U_3O_8$. This solution is at a temperature of approximately 140° F., and contains 46.6 g./l. $Na_2CO_3$ and 2.6 g./l. NaOH. A 220 gpm. stream of this barren liquor is passed through a recarbonation tower and thence through pulp filters as a wash fluid. An analysis of the stream after being utilized as wash fluid in the pulp filters shows 0.07 g./l. $U_3O_8$ to be present. Thus, 0.02 g./l. $U_3O_8$ is being lost as solid yellow cake on the filters, this material passing to waste ponds with the tailings. This represents a loss of 2.2 lb./hr. of yellow cake, and at the present price of $8.00/lb., represents a loss of $17.60/hr.

The above described stream is treated with aqueous hydrogen peroxide by metering this material into the barren liquor stream, just upstream of the recarbonation tower, the amount of aqueous hydrogen peroxide used being sufficient to provide 0.3 g. $H_2O_2$ per g. $U_3O_8$ present. The barren liquor is thus treated with 15.1 ml./min. of 30% by weight aqueous $H_2O_2$, this amount supplying 0.3 g. $H_2O_2$ per g. of $U_3O_8$ present. No precipitation of yellow cake occurs, and the barren liquor, after passing through the pulp filters as wash fluid, contains 0.09 g./l. $U_3O_8$.

Various modifications and alterations of this invention will become apparent to those skilled in the art from the foregoing disclosure, and it should be understood that the subject invention is not to be unduly limited to that set forth herein for illustrative purposes.

We claim:

1. In a carbonate leaching process for leaching uranium bearing ore, wherein said ore is leached with alkaline carbonate-bicarbonate leaching solution, the resulting slurry of leached pulp and pregnant leach solution is filtered in a first filtration zone, the leached pulp retained in said filtration zone is washed with recarbonated barren liquor which is then recycled to said leaching step, the resulting pregnant leach solution is clarified and passed to a precipitation zone where soluble hexavalent values present in said pregnant leach solution are precipitated by the addition of aqueous sodium hydroxide thereto, the resulting slurry of precipitated hexavalent uranium values is passed to a thickening zone and thickened, the resulting thickened slurry is passed to a second filtration zone for the recovery of said precipitated hexavalent uranium values, the overflow from said thickening zone comprising barren liquor is passed to a recarbonation zone, and the resulting recarbonated barren liquor is passed to said first filtration zone and used in washing said leached pulp, the improvement comprising adding hydrogen peroxide to said barren liquor upstream of said recarbonation zone in an amount sufficient to substantially inhibit the post precipitation of soluble hexavalent uranium values in said barren liquor.

2. The process according to claim 1 wherein said hydrogen peroxide is added to said barren liquor as an aqueous solution in an amount of at least 0.3 gram of $H_2O_2$ per gram of $U_3O_8$ present in said barren liquor.

3. The process according to claim 1 wherein said barren liquor contains from about 0.02 to 0.2 gram per liter $U_3O_8$, and said hydrogen peroxide is added as a 10 to 60 weight percent aqueous solution in an amount of 0.3 to 1 gram $H_2O_2$ per gram $U_3O_8$ present in said barren liquor.

References Cited in the file of this patent

UNITED STATES PATENTS

| | | |
|---|---|---|
| 2,813,003 | Thunaes et al. | Nov. 12, 1957 |
| 2,897,048 | Stevenson et al. | July 28, 1959 |
| 2,900,229 | McLaine | Aug. 18, 1959 |

OTHER REFERENCES

AEC Document ACCO-48, pp. 8, 10, 18-21, 28-32, June 18, 1954.

AEC Document WIN-67, pp. 8-12, 14, 15, 18, 19, 21, 27, 29, 30, Feb. 15, 1957.

Clegg et al.: "Uranium Ore Processing" pp. 153-162 (1958).

UNITED STATES PATENT OFFICE
CERTIFICATE OF CORRECTION

Patent No. 3,081,148                       March 12, 1963

John C. Hillyer et al.

It is hereby certified that error appears in the above numbered patent requiring correction and that the said Letters Patent should read as corrected below.

Column 4, line 64, after "hexavalent" insert -- uranium --.

Signed and sealed this 8th day of October 1963.

(SEAL)
Attest:

ERNEST W. SWIDER
Attesting Officer

EDWIN L. REYNOLDS
Acting Commissioner of Patents